I. B. HAMMOND.
CHANGEABLE SPEED FRICTION TRANSMISSION MECHANISM.
APPLICATION FILED FEB. 26, 1910. RENEWED APR. 6, 1912.
1,028,019.
Patented May 28, 1912.
3 SHEETS—SHEET 1.
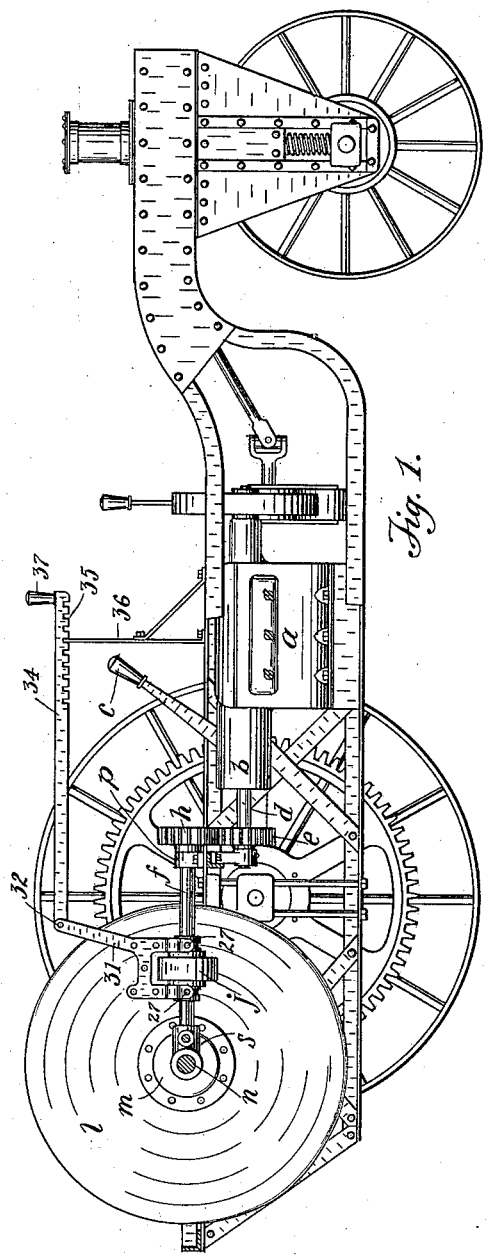
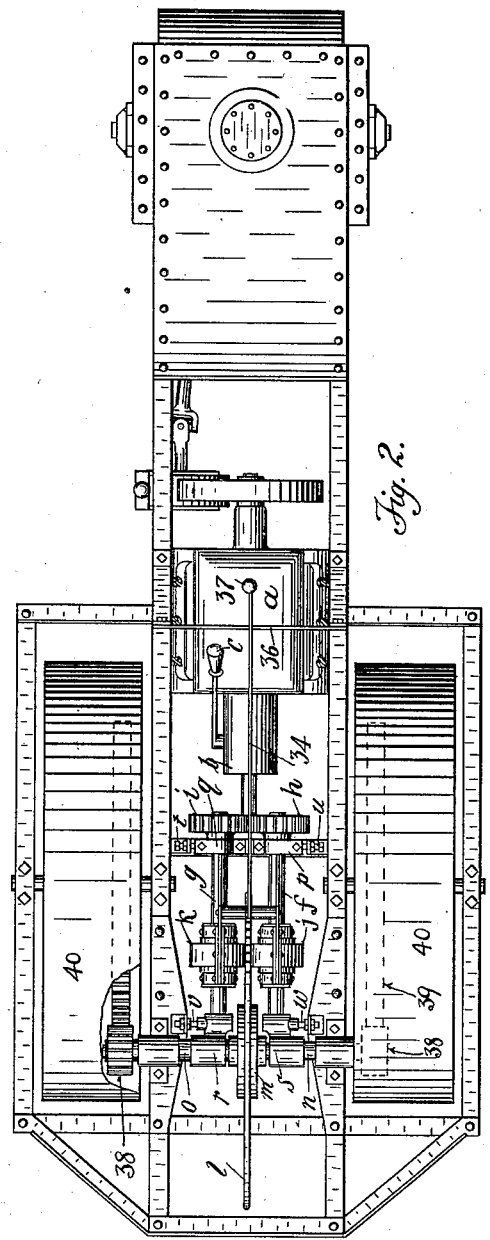
Witnesses:
D. M. Philbrick
O. O. Martin
Inventor:
I. B. Hammond
by T. J. Geisler
Atty.

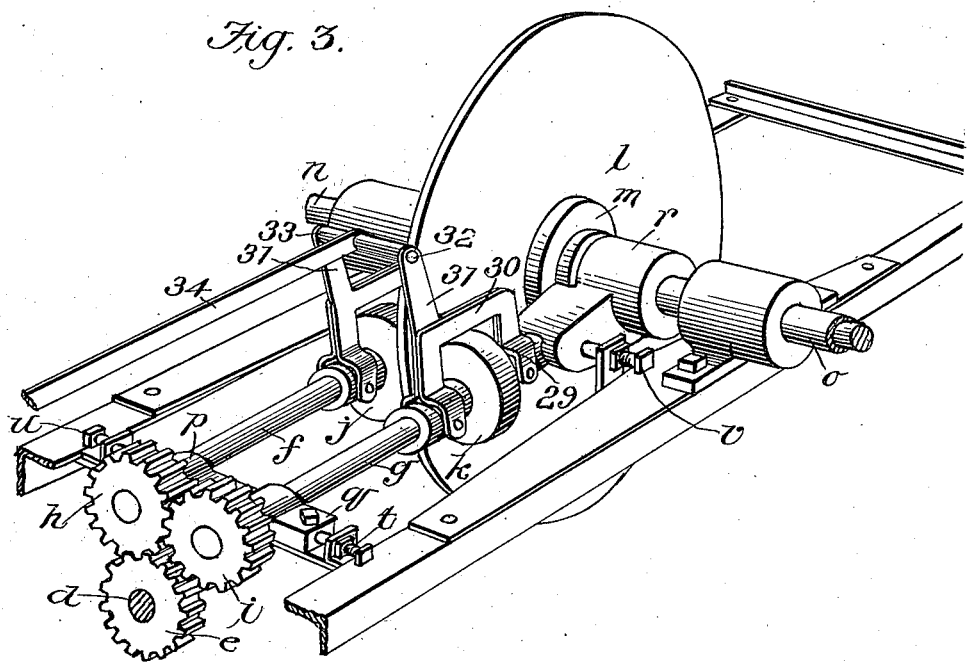
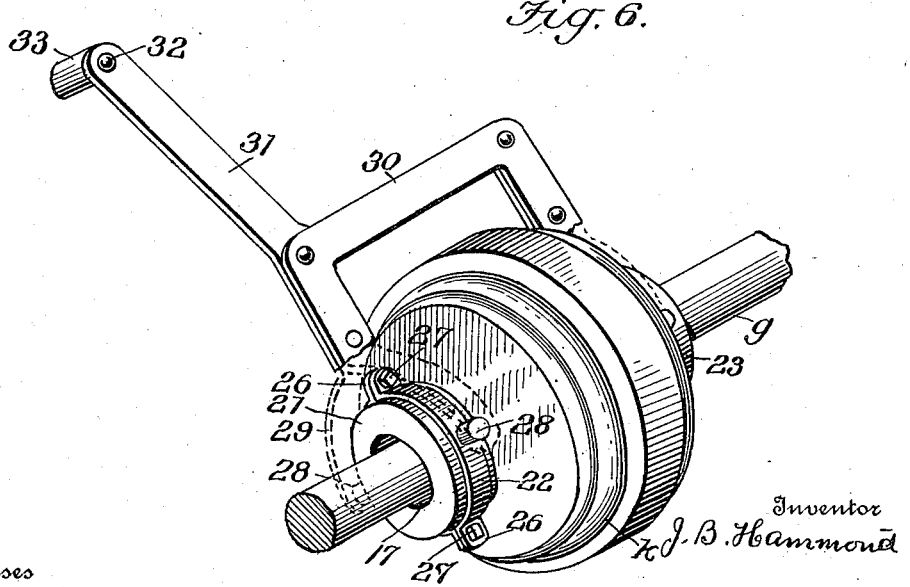

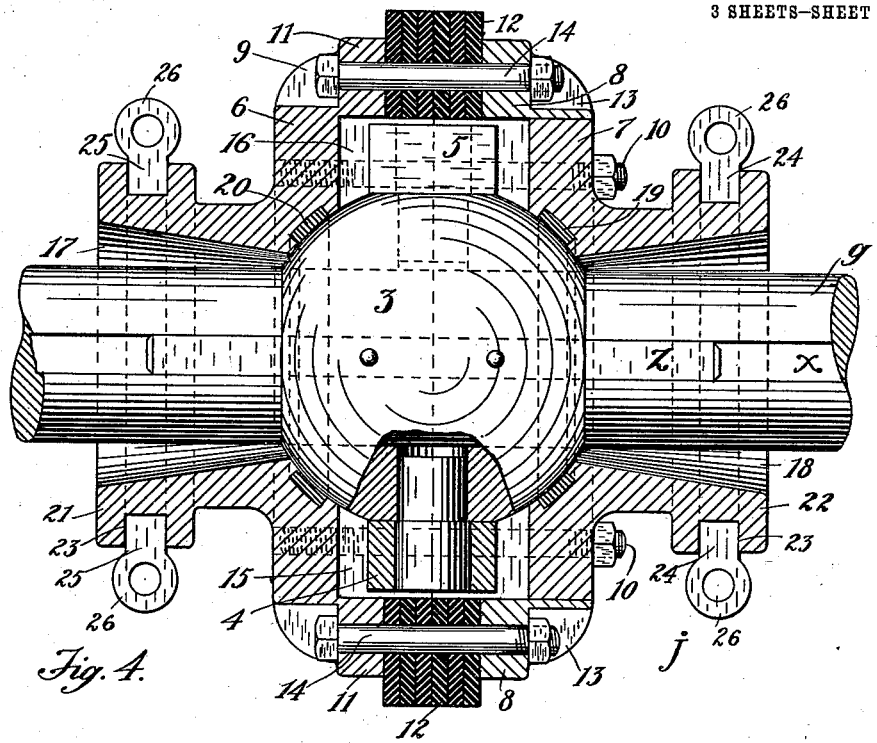

UNITED STATES PATENT OFFICE.

ISAAC B. HAMMOND, OF PORTLAND, OREGON.

CHANGEABLE-SPEED FRICTION TRANSMISSION MECHANISM.

1,028,019. Specification of Letters Patent. Patented May 28, 1912.

Application filed February 26, 1910, Serial No. 546,216. Renewed April 6, 1912. Serial No. 689,045.

*To all whom it may concern:*

Be it known that I, ISAAC B. HAMMOND, a citizen of the United States, and residing at Portland, in the county of Multnomah and State of Oregon, have invented a new and useful Improvement in Changeable-Speed Friction Transmission Mechanism, of which the following is a specification.

This invention relates to means for changing the speed transmitted in a friction transmission mechanism.

In its general scope and purpose my invention comprises the combination in a friction transmission mechanism of a driven gear, a driving gear therefor adapted to be inclined on its axis into oblique position, in the direction of its travel, toward and from the periphery of the driven gear, and means for tilting the driving gear at will as mentioned, so as to cause said driving gear to automatically run in or out, as it were, and place itself nearer to or farther from the periphery of the driven gear, and thus change the speed at which the latter is driven.

To accomplish the purpose of my invention, my improvement also embodies the particular features and arrangements of parts hereinafter more fully set forth.

In the drawings constituting a part of this specification: Figure 1 is a side elevation of a traction engine illustrating the application of my improvements to one mode of practical use, the near side of the frame of the body of the traction engine being broken away, and parts shown in section, so as to disclose the coöperative arrangement of my speed changing devices; Fig. 2 is a plan view of the same traction engine; Fig. 3 is a perspective detail of my speed changing friction drive or transmission mechanism embodied within the traction engine shown in Figs. 1 and 2; Fig. 4 is an enlarged vertical sectional detail of one of the pinions of my said speed changing transmission mechanism; Fig. 5 is a sectional end view of the devices shown in Fig. 4; and Fig. 6 is an enlarged perspective detail of one of the friction pinions of my speed changing transmission mechanism, including the yoke by which the friction pinions on either side of the driven friction gear are connected so as to operate as a unit.

For the purpose of illustrating the utility of my invention, I have shown the same as embodied in the driving devices of a traction engine, but obviously my invention may be incorporated in any type of friction transmission mechanism. Since my invention relates only to providing means for transmitting the driving power at changeable speed, the details of construction of the traction engine itself, in which I have incorporated my improvements, will not be entered into, except as required. The parts not particularly described are understood to be of the common construction.

The engine, $a$, which, in the illustration represents one of the gasolene type, is provided with a transmission gear box $b$, rotating the main driving-shaft $d$. Parallel to the main driving shaft $d$ are journaled two short counter shafts $f$, $g$, on which are rigidly mounted meshing pinions $h$, $i$, and the pinion $h$ thereof meshes with the pinion $e$ on the main driving-shaft $d$. See Fig. 3. On said counter shafts $f$, $g$ are mounted driving friction-pinions, $j$, $k$, bearing against the friction gear $l$, located between them. The friction gear $l$ is operatively connected by means of differential gear mechanism of the usual type, and supposed to be contained in the box $m$ with the axle or shaft $n$ on one side and with a sleeve $o$ mounted on the opposite end of said axle $n$. As it is necessary to cause the friction-pinions, $j$, $k$, to maintain a certain pressure on the driving gear $l$, in order that there will be no slipping, the shafts $f$, $g$ of the pinions $j$, $k$ are mounted in adjustable bearings $p$, $q$, $r$, $s$, and the latter are adjusted and held in position by set-screws $t$, $u$, $v$, $w$.

Referring now to Figs. 4 and 5 in particular, it is to be noted that each of the shafts $f$, $g$ is made with axial key ways $x$, $y$, in which slide the feathers, $z$, $2$, of a spherical bearing-member 3 and slidably mounted on its shaft. In said spherical member 3 are inserted two axial oppositely projecting headed driving pins 4, 5. Each of the pinions, $j$, $k$, is constructed as illustrated in Figs. 4 and 5. It is made of two halves 6, 7, fitted and clamped to said spherical member 3, said halves being bolted together by bolts 10. The half part 6 is made with a laterally projecting peripheral flange 11, forming a seat for a plurality of annular washers 12, made of rubber or other friction material, held in place by a ring 8, bolted to the flange 11 by bolts 14, the ends of which are seated in recesses, 9, 13, in said flange 11 and ring 8. Said washers 12 constitute the friction surface for the friction pinion. The friction pinion is provided with interior rectangular recesses, 15, 16, adapted to receive the driving pins 4, 5 of the spherical member 3. The extremities 17, 18 of the eye of the driving pinion have an outward tapering enlargement, so as to permit said driving pinion to be inclined at an oblique angle to its axis, in the direction of its travel, and thus cause the driving friction-pinion, in its continuing rotation, to run in or out, nearer to or farther from, the periphery of the driven gear $l$, and in so doing change the speed at which the latter is driven. In order to reduce the friction, Babbitt bearing-rings 19, 20 are provided between the abutting faces of the parts, as shown in Fig. 4.

The half parts, 6, 7, of the friction-pinions are made with ends 21, 22, respectively, each provided with a peripheral groove 23, in which are seated rings 24, 25, bolted together by bolts 27, inserted through ears 26. The rings 24, 25 are provided with laterally projecting pins 28, to which are connected the perforated extremities 29 of the spanner members 30 of the arms 31, said arms constituting a yoke, and being connected by means of a rod 32. On the latter is mounted a sleeve 33, to which is connected one end of a rod 34, provided with notches 35, adapted to be engaged with a cross-bar 36; said rod 34, for convenience, being provided with a handle 37. Thus, by pulling the rod 34 forward or pushing it backward, the two pistons, $j$, $k$, are correspondingly tilted upon their respective shafts and caused to run inward or outward on the driven friction gear $l$ for an interval until the friction pinions have again assumed a perpendicular relation to their axes, when they will have no further inward or outward movement, but revolve in a fixed position and drive the friction gear $l$ at constant speed, and the degree of the movement of the rod 34 will also determine the degree of the movement of the friction disks between the circumference and center of the driven gear $l$. Thus the degree in the increase or decrease of speed is governed by the degree of movement of the rod 34; and the notches of the latter enable the operator to secure the rod in place, after having been moved the desired degree.

The drawings of this case also illustrate means for transmitting the driving power, so as to steer the traction engine; but such devices constitute the basis for a co-pending application for patent made by me, filed February 26, 1910, Serial Number 546,218, and the details are not entered into in this application because not a necessary part of the invention herein described.

On the driving axle or shaft $o$ are pinions 38 meshing with gears 39 of the ground or driving wheels 40.

I claim:

1. In a friction transmission mechanism, a driven gear, a driving gear running on said driven gear and adapted to be inclined on its axis, and thus cause it to move inward or outward of the circumference of the driven gear; and means, including a notched rod and cross-bar, for tilting said driving gear at will, said means adapted to limit said movement of the driving gear within a predetermined degree, and thence permitting said driving gear to reassume its normal position, perpendicular to its axis.

2. In a friction transmission mechanism, a pair of driving gears and a driven gear interposed between them, each of said driving gears adapted to be inclined on its axis, and thus cause it to move inward or outward of the circumference of the driven gear; a yoke connecting said driving gears; and means for tilting said driving gears at will.

3. In a friction transmission mechanism, a pair of driving gears and a driven gear interposed between them, each of said driving gears adapted to be inclined on its axis, and thus cause it to move inward or outward of the circumference of the driven gear; a yoke connecting said driving gears; and means for tilting said driving gears at will, said means adapted to limit said movement of the driving gears within a predetermined degree, and thence permitting them to reassume their normal position, perpendicular to its axis.

4. In a friction transmission mechanism, a pair of driving gears and a driven gear interposed between them, each of said driving gears adapted to be inclined on its axis, and thus cause it to move inward or outward of the circumference of the driven gear; a yoke connecting said driving gears; and means, including a notched rod and cross-bar, for tilting said driving gears at will, said means adapted to limit said movement of the driving gears within a predetermined degree, and thence permitting them to reassume their normal position, perpendicular to its axis.

5. In a friction transmission mechanism, a driven disk, a driving shaft, a spherical member mounted thereon longitudinally movable, a friction gear movably mounted on said spherical member and driving said driven disk; means connecting the spherical member with the friction gear thereon mounted, said means permitting said driving gear to be inclined on its axis so as to cause it to move inward and outward of the circumference of said driven disk; and means for tilting said driving gear on said spherical member.

6. In a friction transmission mechanism, a driven disk, a driving shaft, a spherical member mounted thereon longitudinally movable, a divided friction gear movably mounted on said spherical member and driving said driven disk; means connecting the spherical member with the friction gear thereon mounted, said means permitting said gear to be inclined on its axis so as to cause it to move inward and outward of the circumference of said driven disk, the eye of said driving gear having a tapering enlargement toward both ends, so as to permit said inclination; and means for tilting said driving gear on said spherical member.

7. In a friction transmission mechanism, a driven disk, a driving shaft, a spherical member mounted thereon longitudinally movable, a friction gear movably mounted on said spherical member and driving said driven disk; means connecting the spherical member with the friction gear thereon mounted, said means permitting said gear to be inclined on its axis so as to cause it to move inward and outward of the circumference of said driven disk, and means for tilting said driving gear on said spherical member, said means adapted to limit said movement of it within a predetermined degree, and thence permitting said driving gear to reassume its normal position, perpendicular to its axis.

8. In a friction transmission mechanism, a driven disk, a driving shaft, a spherical member mounted thereon longitudinally movable, a divided friction gear movably mounted on said spherical member and driving said driven disk; means connecting the spherical member with the friction gear thereon mounted, said means permitting said gear to be inclined on its axis so as to cause it to move inward and outward of the circumference of said driven disk, and means, including a notched rod and crossbar, for tilting said driving gear on said spherical member, said means adapted to limit said movement of the driving gear within a predetermined degree, and thence permitting it to reassume its normal position, perpendicular to its axis.

ISAAC B. HAMMOND.

Witnesses:
A. LITTLE,
O. O. MARTIN.